(12) United States Patent
Tuel (10) Patent No.: US 7,447,851 B2
(45) Date of Patent: *Nov. 4, 2008

(54) SYSTEM FOR PAGE-OUT AND PAGE-IN OF STALE OBJECTS IN MEMORY

(75) Inventor: Anthony Ryan Tuel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/019,149

(22) Filed: Jan. 24, 2008

(65) Prior Publication Data

US 2008/0140954 A1   Jun. 12, 2008

Related U.S. Application Data

(63) Continuation of application No. 11/080,326, filed on Mar. 15, 2005, now Pat. No. 7,325,108.

(51) Int. Cl.
*G06F 12/00* (2006.01)
(52) U.S. Cl. .................. 711/159; 711/165; 711/112; 707/206
(58) Field of Classification Search .......... None
See application file for complete search history.

(56) References Cited

U.S. PATENT DOCUMENTS

| | | | |
|---|---|---|---|
| 4,797,810 A | 1/1989 | McEntee et al. | |
| 6,317,756 B1 | 11/2001 | Kolodner et al. | |
| 6,567,905 B2 | 5/2003 | Otis | |
| 6,681,306 B1 | 1/2004 | Kessler et al. | |
| 6,763,440 B1 | 7/2004 | Traversat et al. | |
| 6,839,725 B2 | 1/2005 | Agesen et al. | |
| 2002/0019716 A1 | 2/2002 | Agesen et al. | |
| 2002/0099765 A1 | 7/2002 | Otis | |
| 2002/0116409 A1 | 8/2002 | Sokolov et al. | |
| 2002/0133533 A1 | 9/2002 | Czajkowski et al. | |
| 2003/0037060 A1 | 2/2003 | Kuehnel | |
| 2004/0039758 A1 | 2/2004 | Li | |
| 2004/0168030 A1 | 8/2004 | Traversat et al. | |
| 2004/0193662 A1 | 9/2004 | Garthwaite | |

*Primary Examiner*—Reginald G. Bragdon
*Assistant Examiner*—Larry T Mackall
(74) *Attorney, Agent, or Firm*—Duke W. Yee; Bruce Clay; Mari A. Stewart (57) ABSTRACT

A system for moving an object from a short lived memory area in a program address space on a physical memory into a tenured memory area in response to a determination that the object has not been freed from the short lived memory area. If the object in the tenured memory area is determined to be stale, then the object is moved to a native memory area in the program address space. If the object in the native memory area is referenced by a processing unit, then the object is moved into the tenured memory area. If the object in the native memory area is not referenced, then it will be determined if page-out to a page file on hard disk is required. If the object is referenced in the page file, then the object is moved to the program address space.

13 Claims, 5 Drawing Sheets

SYSTEM FOR PAGE-OUT AND PAGE-IN OF STALE OBJECTS IN MEMORY

This application is a continuation of application Ser. No. 11/080,326, filed Mar. 15, 2005, now U.S. Pat. No. 7,325,108 status, allowed.

BACKGROUND OF THE INVENTION

1. Technical Field

The present invention relates generally to an improved data processing system. More specifically, the present invention is directed to a method, apparatus, and computer program product for the page-out and page-in of stale objects stored in memory in a data processing system.

2. Description of Related Art

Memory is a data processing system's workspace. Physically, memory is a collection of Random Access Memory (RAM) computer chips. Memory is an important resource for the data processing system, since memory determines the size and number of programs that can be run on the data processing system at the same time, as well as the amount of data that can be processed.

All program execution and data processing takes place in the data processing system's memory. A program's instructions are copied into memory from a disk, a tape, or from a network. Then, the program instructions are extracted from memory by a processing unit for analysis and execution. Memory is such an important resource to the data processing system that it cannot be wasted. Memory must be allocated by the operating system (OS), as well as by the programs, and then released when not needed.

The OS is the master control program that runs the data processing system and is the first program loaded when the data processing system is turned on. Common operating systems may include IBM mainframe OS/390 and the AS/400's OS/400, the many versions of WINDOWS (95, 98, NT, ME, 2000, and XP), versions of UNIX (SOLARIS and LINUX), and the MACINTOSH OS. The OS, which resides in memory at all times, starts and communicates with all programs that run in the data processing system.

Also, the OS controls program address space allocation and extends the physical RAM by implementing a virtual memory on a physical hard disk. The virtual memory created by the OS will be known as an OS page file. The virtual memory page file temporarily stores objects of a program on the hard disc when there is not enough physical memory to hold all the programs. Paging is the movement of an object between physical and virtual memory in the data processing system to optimize performance without the user being aware that the transfer has taken place.

Program address space is the portion of memory used by a program when running. The program address space may refer to physical memory or virtual memory or a combination of both. A program running on the OS is comprised of a set of instructions. The program's set of instructions needs to allocate memory from within the program address space the OS has assigned to the program. If the program continues to allocate memory for data buffers and eventually exceeds the physical memory capacity, the OS then has to place parts of the program in virtual memory on hard disk in order to continue, which slows down processing.

Objects are the basic software building blocks of object-oriented programming. Objects are a collection of variables, data structures, and procedures stored as a self-contained entity. JAVA is an example of object-oriented programming language designed to generate programs that can run on all hardware platforms, small, medium and large, without modification. Developed by Sun Microsystems, Inc., JAVA has been promoted and geared heavily for the Web, both for public Web sites and intranets. JAVA is not compiled into machine language for a specific hardware platform, it is compiled into an intermediate language called "bytecode." The bytecode program may be run in any hardware that has a JAVA Virtual Machine (JVM) runtime program available for it.

JVM is a JAVA interpreter. The JVM is software that converts the JAVA intermediate language (bytecode) into machine language and executes it. This means JAVA programs are not dependent on any specific hardware and will run in any computer with the JVM software. JAVA was designed to run in small amounts of memory and provides enhanced features for the programmer, including the ability to release memory when no longer required. This automatic "garbage collection" feature has been lacking in previous programming languages and has been the bane of programmers for years. Garbage collection is a software routine that searches memory for areas of inactive data and instructions in order to reclaim that space for the general memory pool (the heap).

C programming language, for example, does not do automatic garbage collection, which requires that the programmer specifically deallocate memory in order to release it. Deallocating memory after a routine no longer needs it is a tedious task and programmers often forget to do it or do not do it properly. JAVA performs automatic garbage collection without programmer intervention, which eliminates this coding problem.

A JAVA heap refers to a common pool of physical memory that is available to the JAVA program. The management of the heap is done by the JAVA program in allocating objects as required and by the garbage collector in deallocating objects which are no longer needed. Currently, JAVA operates in such a manner that some types of data loaded during program execution will remain in physical memory for the life of the JVM.

Static data and cache data, which are seldom referenced by program instructions, are examples of stale data that remains in physical memory for the life of the JVM. Static data and cache data will remain in the JAVA heap and will be continually referenced by the garbage collector. This continual referencing of the static and cache data insures that they will remain in physical memory because the OS will not page-out data that is continually referenced. Also, the static and cache data will increase the CPU overhead (amount of processing time used) during garbage collection cycles because the entire physical memory heap has to be traversed to determine if the data can be garbage collected. The increased overhead decreases processor performance and productivity in executing program instructions.

Another problem with retaining the static and cache data in the JAVA heap is that the amount of free physical memory space available for program instruction execution is decreased. Decreased heap space in physical memory requires that the garbage collector run more frequently to free unused memory. As a result, more CPU cycles are "burned" in memory management rather than program instruction execution.

Therefore, it would be advantageous to have an improved method and system for the page-out and page-in of seldom referenced objects (stale objects) stored in the memory of a data processing system.

BRIEF SUMMARY OF THE INVENTION

The present invention provides a method, apparatus, and computer program product for the page-out and page-in of stale objects stored in a data processing system's memory. The process of the present invention begins with moving an object from a short lived memory area in a program address space to a tenured memory area in the program address space in response to determining that the object has not been freed from the short lived memory area. If the object in the tenured memory area is determined to be stale, then the object is moved to a native memory area in the program address space. If the object in the native memory area is referenced by a processing unit, then the object will be moved back to the tenured memory area. If the object is not referenced in the native memory area, then the operating system will determine if page-out of the object to a page file on a hard disk is necessary. If page-out is necessary, then the object is moved to the page file. If the object in the page file is referenced, then the object is moved into the program address space.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
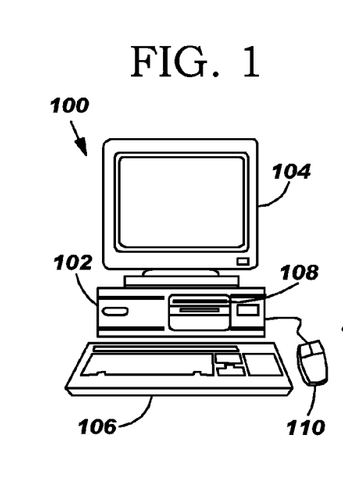
FIG. 1 is a pictorial representation of a data processing system in which the present invention may be implemented in accordance with a preferred embodiment of the present invention.

With reference now to the figures, FIG. 1 a pictorial representation of a data processing system in which the present invention may be implemented is depicted in accordance with a preferred embodiment of the present invention. A computer 100 is depicted which includes a system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
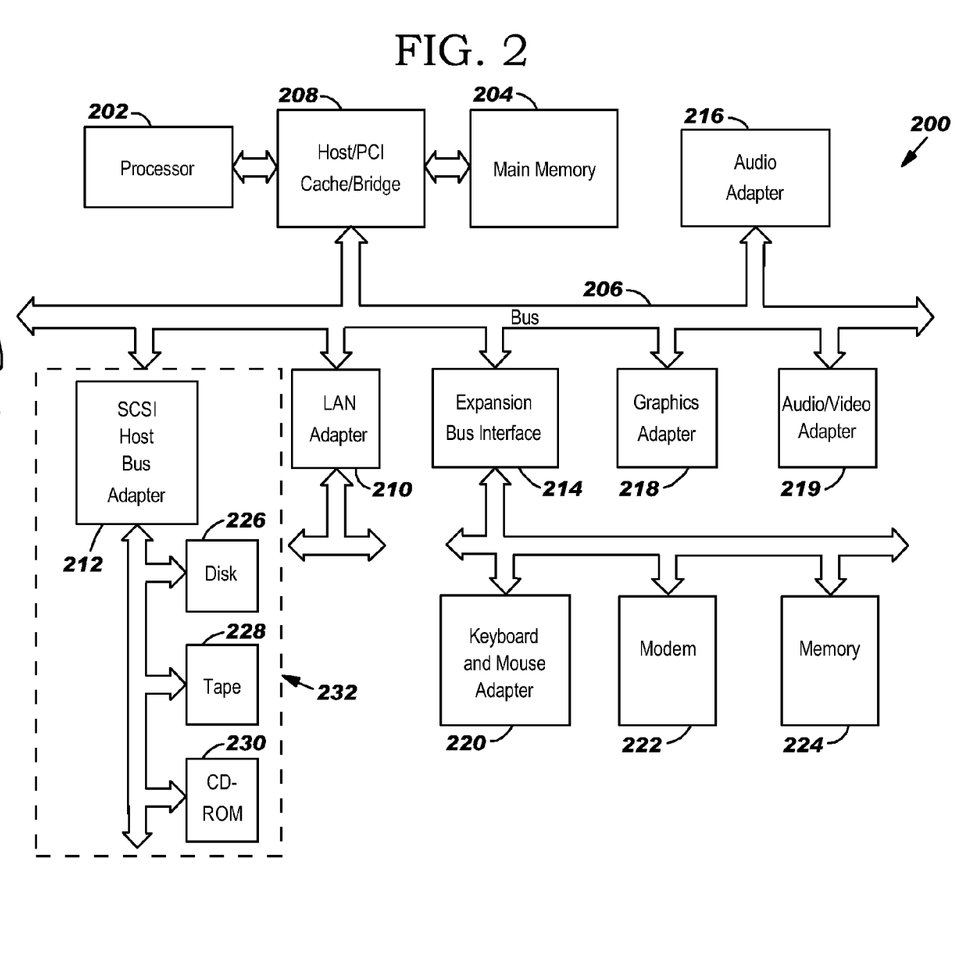
FIG. 2 is an exemplary block diagram of a data processing system in which a preferred embodiment of the present invention may be implemented.

Referring now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as WINDOWS 2000, which is available from Microsoft Corporation. An object oriented programming system such as JAVA may run in conjunction with the operating system and provides calls to the operating system from JAVA programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer program product for the page-out of stale objects stored on physical memory to virtual memory on hard disk. The page-out of stored stale objects in physical memory improves processor productivity by reducing processing unit overhead. Processing unit overhead is reduced because the garbage collection software program does not have to continually traverse seldom referenced (stale) objects stored in the memory heap every garbage collection cycle.

Also, the page-out of stale objects from physical memory to virtual memory will increase available physical memory space in a data processing system. An increase in the data processing system's available physical memory space will translate into increased productivity by allowing more programs to be loaded and run by the data processing system. In addition, the present invention provides a method, apparatus, and computer program product for the page-in of stale objects stored in virtual memory to physical memory if the stale object is referenced by the processing unit. Thus, the stale object may be restored to physical memory from virtual memory if the need arises.

Figure 3:
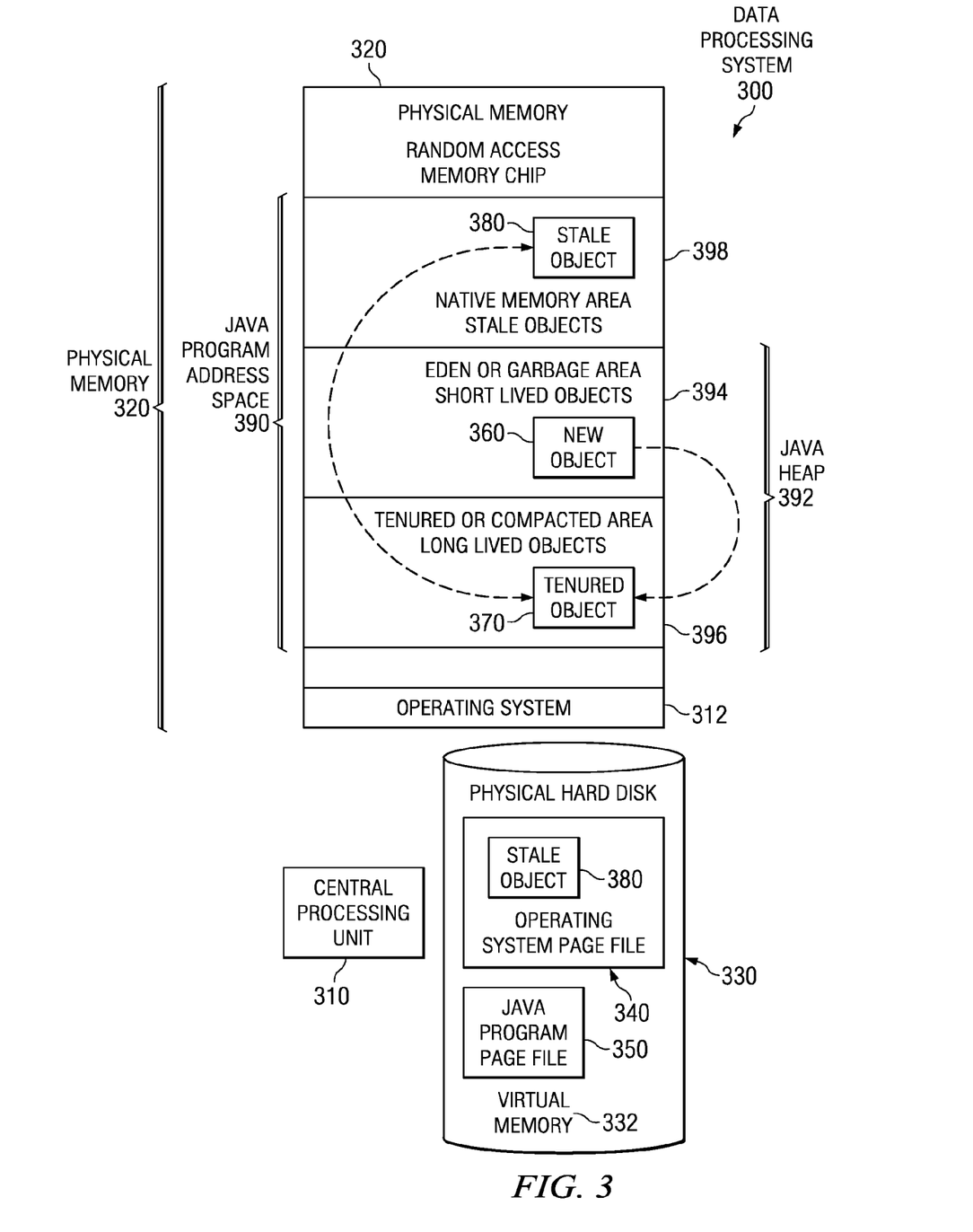
FIG. 3 is an illustration of an operating system page file process for page-out and page-in of stale JAVA objects stored in memory in which a preferred embodiment of the present invention may be implemented.

Referring now to FIG. 3, an illustration of an operating system page file process for page-out and page-in of stale JAVA objects stored in memory is depicted in which a preferred embodiment of the present invention may be implemented. The page-out and page-in process performed by the operating system for the operating system page file may be implemented in a data processing system, such as data processing system 200 in FIG. 2.

In this illustrative example, data processing system 300 comprises, but is not limited to: central processing unit (CPU) 310, such as, for example, processor 202 in FIG. 2; physical memory 320, such as, for example, main memory 204 in FIG. 2; and hard disk 330, such as, for example, disk 226 in FIG. 2.

Physical memory 320 may be a random access memory (RAM) chip, which may contain operating system (OS) 312. OS 312 manages data processing system 300's resources by allocating program address space (for example, JAVA program address space 390) on physical memory 320. Also, OS 312 will extend or increase physical memory 320 by implementing operating system page file 340 on hard disk 330. Moreover, OS 312 will further manage the program address space by moving objects between physical memory 320 and virtual memory 332. For example, if data processing system 300 runs low on memory, operating system 312 will move stale object 380 from physical memory 320 to operating system page file 340 in virtual memory 332.

A JAVA program running on data processing system 300 comprises a set of instructions that will require space allocated on physical memory 320. The allocation of physical memory for the set of instructions will be contained within JAVA program address space 390, which OS 312 assigned to the program. The JAVA program is represented by JAVA program address space 390, which comprises JAVA heap 392 for JAVA objects and native memory area 398 for stale objects and other JVM related uses. JAVA heap 392 consists of Eden area 394 and tenured area 396.

A JAVA program, such as JAVA Virtual Machine, may include an algorithm for managing objects itself in JAVA program address space 390. The algorithm may be utilized to determine if new object 360, which is in Eden area 394, will be moved into tenured area 396. Once new object 360 is moved to tenured area 396, new object 360 becomes tenured object 370, and will remain in physical memory 320 or virtual memory 332 for an undetermined period of time. Consequently, the need arises for the effective and efficient management of tenured object 370 as it moves through the memory to increase productivity and performance of data processing system 300.

Additionally, the algorithm may define a tenured object set, such as, for example, objects contained in tenured area 396. The algorithm, for example, may define tenured object 370 as an object referenced at least once every minute by CPU 310. If tenured object 370 is not accessed at least once a minute by CPU 310, then the memory management algorithm may consider tenured object 370 stale and move it to native memory area 398 (e.g., stale object 380). Thus, the creation of stale object 380 may be determined by how many times tenured object 370 is referenced by CPU 310 during a specified time period. Of course, user requirements for data processing systems differ greatly and therefore the granularity for determining the tenured object set may be adjusted according to the user's or system's needs either automatically by the data processing system or manually by the user.

Objects are moved from tenured area 396 to native memory area 398 because a garbage collector will not reference stale object 380 in native memory area 398. The garbage collector is a garbage collection software program that searches memory for inactive objects in order to reclaim address space for the memory heap (e.g., JAVA heap 392). The garbage collector will only reference JAVA heap 392 for garbage collection. Since native memory area 398 is not referenced by the garbage collector, CPU 310 productivity will be increased by not continually using processing cycles to traverse accumulated stale objects in native memory area 398. Thus, moving tenured object 370 from tenured area 396 to native memory area 398 effectively decreases processing overhead for CPU 310.

Another example of memory object management may consist of a JVM which utilizes a flat memory model to compact objects in JAVA heap 392. In the flat memory model, an object on the bottom of JAVA heap 392 is considered tenured (e.g., tenured object 470), whereas an object on the top of JAVA heap 392 is considered short lived (e.g., new object 360).

The process steps of FIG. 3 will be outlined in the detailed description of FIG. 5 below.

Figure 4:
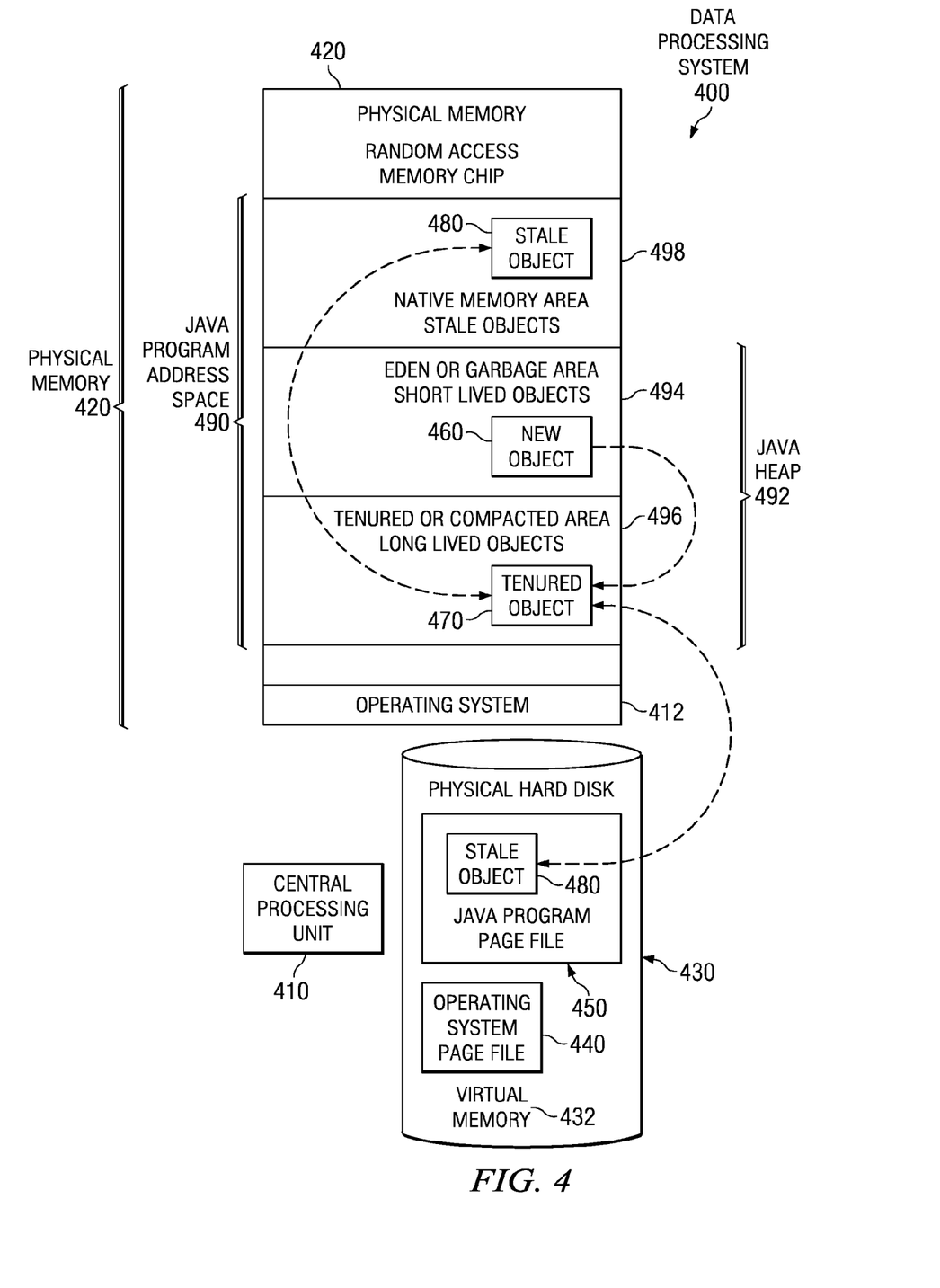
FIG. 4 is an illustration of a JAVA program page file process for page-out and page-in of stale JAVA objects stored in memory in which a preferred embodiment of the present invention may be implemented.

Turning now to FIG. 4, an illustration of a JAVA program page file process for page-out and page-in of stale JAVA objects stored in memory in which a preferred embodiment of the present invention may be implemented is shown. The page-out and page-in process performed by the JVM for the JAVA program page file may be implemented in a data processing system, such as data processing system 200 in FIG. 2.

In this illustrative example, data processing system 400 comprises, but is not restricted to: central processing unit (CPU) 410, such as, for example, processor 202 in FIG. 2; physical memory 420, such as, for example, main memory 204 in FIG. 2; and hard disk 430, such as, for example, disk 226 in FIG. 2.

The JAVA program page file process of FIG. 4 is similar to the operating system page file process described in FIG. 3 above, with the exception of how tenured object 470 is managed in memory. In FIG. 4, tenured object 470, after being determined to be stale, is moved directly from tenured area 496 to JAVA program page file 450 on hard disk 430. In contrast, the method of FIG. 3 would have moved tenured object 470 to native memory area 498 prior to being moved to operating system page file 440 on hard disk 430. Accordingly, even though the method of FIG. 3 and the method of FIG. 4 have several identical process steps, the two methods are distinct. The process steps of FIG. 4 will be discussed in the detailed description of FIG. 6 below.

Figure 5:
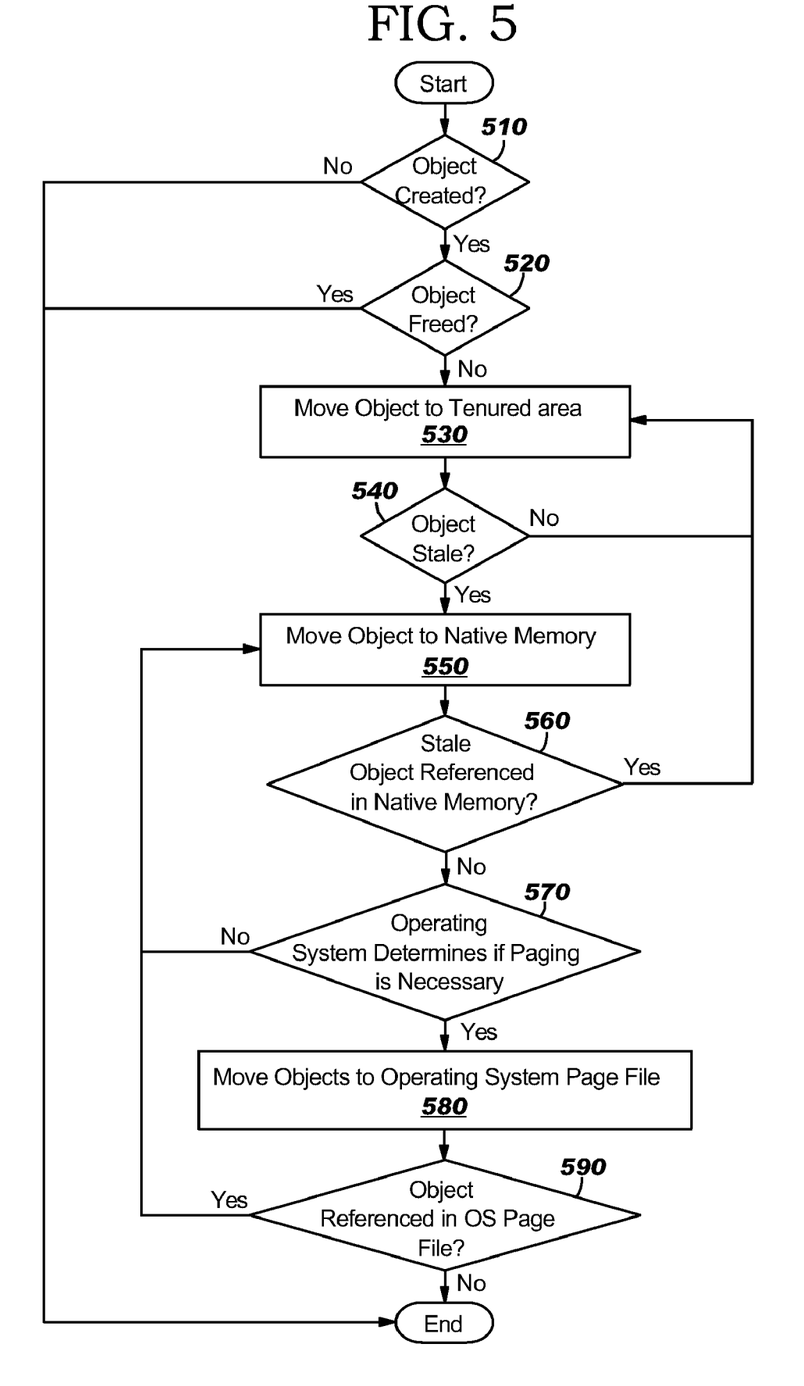
FIG. 5 is a flowchart outlining the exemplary process of FIG. 3 in accordance with a preferred embodiment of the present invention.

With reference now to FIG. 5, a flowchart outlining the exemplary operating system page file process of FIG. 3 in accordance with a preferred embodiment of the present invention is depicted. The process may be implemented, for example, in data processing system 300 of FIG. 3. The process begins with a determination whether an object has been created in a program address space on physical memory (step 510). For example, new object 360 created in JAVA program address space 390 on physical memory 320 in FIG. 3. All new objects will be initially allocated address space in an Eden area for short lived objects. For example, new object 360 allocated to Eden area 394 in FIG. 3.

If no new object is determined to have been created in the Eden area (no output of step 510), then the process terminates thereafter. If a new object is created in the Eden area (yes output of step 510), then a determination is made as to whether the new object address space has been freed or released (step 520). If the new object address space in the Eden area has been freed, then the process terminates thereafter (yes output of step 520). If the new object address space has not been freed (no output of step 520), then the new object will be moved to a tenured area for long lived objects (step 530). For example, new object 360, in Eden area 394, is moved to tenured area 396, to become tenured object 370, in FIG. 3.

After the new object in the Eden space has been moved to the tenured area in step 530, a determination is made as to whether the tenured object has become stale (step 540). If the tenured object is not determined to be stale (no output of step 540), then the process returns to step 530 where the tenured object will remain in the tenured area. If a determination is made that the tenured object is stale (yes output of step 540), then the tenured object is moved to native memory (step 550). For example, tenured object 370, in tenured area 396, is moved to native memory area 398, to become stale object 380 in FIG. 3.

Subsequent to the tenured object being moved to native memory from the tenured area in step 550, a determination is made as to whether the stale object is referenced by a processing unit, such as, for example, CPU 310 in FIG. 3 (step 560). If the stale object has been referenced (yes output of step 560), then the stale object will be returned to the tenured area in step 530. For example, stale object 380, in native memory area 398, is moved back to tenured area 396 to become tenured object 370 once again in FIG. 3.

If the processing unit has not referenced the stale object in step 560, then an OS, such as, for example, OS 312 in FIG. 3, will determine whether page-out of the stale object to virtual memory on hard disk is necessary. If the OS determines that page-out of the stale object is not necessary (no output of step 570), then the stale object will remain in native memory. If the OS determines that page-out of the stale object is necessary (yes output of step 570), then the stale object is moved to an operating system page file on a hard disk (step 580). For example, stale object 380 is moved from native memory area 398 to operating system page file 340 on hard disk 330 in FIG. 3.

Following movement of the stale object to the operating system page file in step 580, a determination is made as to whether the stale object contained in the operating system page file is referenced by the processing unit (step 590). If the stale object contained in the operating system page file is not referenced (no output of step 590), then the process terminates thereafter. If the stale object contained in the operating system page file is referenced (yes output of step 590), then the stale object is moved from the operating system page file to native memory in step 550. For example, stale object 380 contained in operating system page file 340, on hard disk 330, is moved to native memory area 398 in JAVA program address space 390, on physical memory 320, in FIG. 3.

Figure 6:
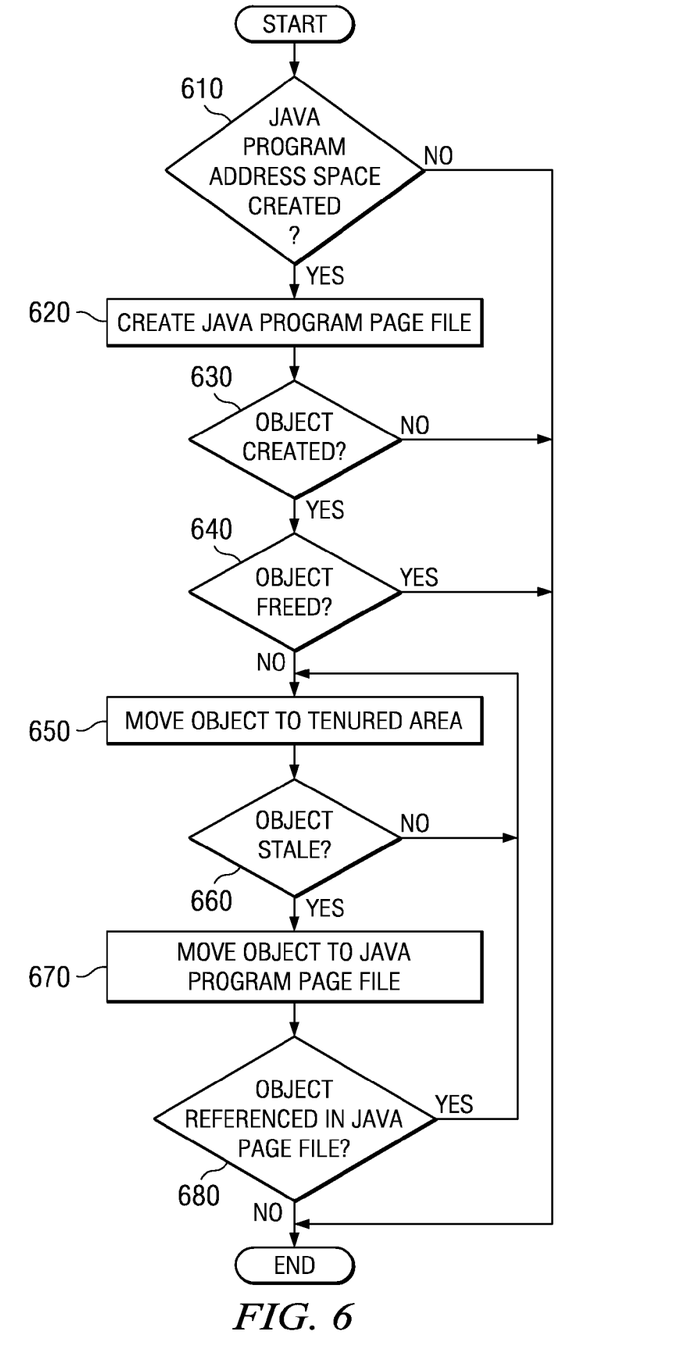
FIG. 6 is a flowchart outlining the exemplary process of FIG. 4 in accordance with a preferred embodiment of the present invention.

Referring now to FIG. 6, a flowchart outlining the exemplary JAVA program page file process of FIG. 4 is shown in accordance with a preferred embodiment of the present invention. The process may be implemented, for example, in data processing system 400 of FIG. 4. The process begins with a determination whether a JAVA program address space has been created by the operating system (step 610). For example, JAVA program address space 490, is created on physical memory 420, by operating system 412 in FIG. 4.

If a JAVA program address space has not been created (no output of step 610), then the process terminates thereafter. If a JAVA program address space has been created by the operating system (yes output of step 610), then a JAVA program page file is created in virtual memory on hard disk (step 620). For example, JAVA program page file 450, is created in virtual memory 432, on hard disk 430 in FIG. 4.

After the JAVA program page file is created in step 620, then a determination is made as to whether a new object has been created (step 630). For example, new object 460 in JAVA program address space 490 in physical memory 420 of FIG. 4. All new objects will be initially allocated address space in an Eden area for short lived objects. For example, new object 460 created in Eden area 494 of FIG. 4.

If no new object is determined to have been created in the Eden area (no output of step 630), then the process terminates thereafter. If a new object is created in the Eden area (yes output of step 630), then a determination is made as to whether the new object address space has been freed or released (step 640). If the new object address space in the Eden area has been freed, then the process terminates thereafter (yes output of step 640). If the new object address space has not been freed (no output of step 640), then the new object will be moved to a tenured area for long lived objects (step 650). For example, new object 460, in Eden area 494, is moved to tenured area 496, to become tenured object 470, in FIG. 4.

After the new object in the Eden space has been moved to the tenured area in step 650, a determination is made as to whether the tenured object has become stale (step 660). If the tenured object is not determined to be stale (no output of step 660), then the process returns to step 650 where the tenured object will remain in the tenured area. If a determination is made that the tenured object is stale (yes output of step 660), then the tenured object is moved to the JAVA program page file (step 670). For example, tenured object 470, in tenured area 496, is moved to JAVA program page file 450, in virtual memory 432, on hard disk 430, to become stale object 480 in FIG. 4.

Subsequent to moving the stale tenured object to the JAVA program page file on hard disk in step 670, a determination is made as to whether the stale object is referenced by a processing unit, such as, for example, CPU 410 in FIG. 4, in the JAVA program page file (step 680). If the stale object contained in the JAVA program page file is not referenced (no output of step 680), then the process terminates thereafter. If the stale object contained in the JAVA program page file is referenced by the processing unit, then the stale object is moved back to the tenured area in the JAVA program address space. For example, stale object 480, in JAVA program page file 450, on hard disk 430, is moved back to tenured area 496, in JAVA program address space 490, to become tenured object 470 once again in FIG. 4.

Thus, the present invention provides a method, apparatus, and computer program product for page-out and page-in of stale objects stored in memory in a data processing system. An advantage of the present invention is the ability to increase processor productivity by decreasing processor overhead. Decreasing processing unit overhead is accomplished by moving stale objects into native memory or virtual memory so that the stale objects will not be continually referenced during garbage collector cycles. Another advantage to the current invention is the ability to increase physical memory space by moving stale objects out of physical memory into virtual memory on hard disk.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
   a bus system;
   a hard disk connected to the bus system;
   a memory connected to the bus system, wherein the memory includes a set of instructions; and
   a processing unit connected to the bus system, wherein the processing unit executes the set of instructions to move an object from a short lived memory area in a program address space into a tenured memory area in the program address space in response to a determination that the object has not been freed from the short lived memory area; move the object from the tenured memory area into a native memory area in the program address space in response to determining that the object is stale; determine if the object has been referenced in the native memory area by the processing unit; move the object into the tenured memory area if the object has been referenced in the native memory area; determine if a page-out to a page file created on a hard disk is required if the object has not been referenced in the native memory area; move the object into the page file if the page-out is required; and move the object into the program address space in response to a reference of the object in the page file.

2. The data processing system of claim 1, wherein the determination of when the object is to be moved is performed by a program address space memory management algorithm.

3. The data processing system of claim 1, wherein the created page file on the hard disk may be one of a program page file and an operating system page file.

4. The data processing system of claim 3, wherein the moving step for the object in the tenured memory area further comprises:
   the processing unit executes further instructions to move the object directly to the program page file.

5. The data processing system of claim 3, wherein moving the object in the page file to the program address space further comprises:
   the processing unit executes further instructions to move the object to the tenured memory area if the object is referenced in the program page file; and
   the processing unit executes further instructions to move the object to the native memory area if the object is referenced in the operating system page file.

6. The data processing system of claim 1, wherein the program is an object oriented program language.

7. The data processing system of claim 1, wherein the processing unit comprises one of a plurality of processing units.

8. A computer program product in a recordable-type media for the page-out and page-in of a stale object stored in a memory, comprising:
   first instructions for moving an object from a short lived memory area in a program address space into a tenured memory area in the program address space in response to a determination that the object has not been freed from the short lived memory area;
   second instructions for moving the object from the tenured memory area into a native memory area in the program address space in response to determining that the object is stale;
   third instructions for determining if the object has been referenced in the native memory area by a processing unit;
   fourth instructions for moving the object into the tenured memory area if the object has been referenced in the native memory area;
   fifth instructions for determining if a page-out to a page file created on a hard disk is required if the object has not been referenced in the native memory area;
   sixth instructions for moving the object into the page file if the page-out is required; and
   seventh instructions for moving the object into the program address space in response to a reference of the object in the page file.

9. The computer program product as recited in claim 8, wherein the determination of when the object is to be moved is performed by a program address space memory management algorithm.

10. The computer program product as recited in claim 8, wherein the created page file on the hard disk may be one of a program page file and an operating system page file.

11. The computer program product as recited in claim 10, wherein the moving step for the object in the tenured memory area further comprises:

eighth instructions for moving the object directly to the program page file.

12. The computer program product as recited in claim 10, wherein moving the object in the page file to the program address space further comprises:

ninth instructions for moving the object to the tenured memory area if the object is referenced in the program page file; and tenth instructions for moving the object to the native memory area if the object is referenced in the operating system page file.

13. The computer program product as recited in claim 8, wherein the program is an object oriented program language.

* * * * *